US006484568B1

(12) United States Patent
Griffith et al.

(10) Patent No.: US 6,484,568 B1

(45) Date of Patent: Nov. 26, 2002

(54) APPARATUS AND METHOD FOR FOAMING FLUIDS AND FOR TESTING FOAMED FLUIDS

(75) Inventors: James E. Griffith, Duncan, OK (US); Ricky A. Cox, Comanche, OK (US); John L. Dennis, Jr., Marlow, OK (US); Bryan K. Waugh, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1 day.

(21) Appl. No.: 09/815,238

(22) Filed: Mar. 22, 2001

(51) Int. Cl.[7] .......................... G01N 37/00

(52) U.S. Cl. .......................... 73/60.11; 73/64.41

(58) Field of Search .......................... 73/60.11, 53.01, 73/54.01, 64.41, 152.18, 152.27, 152.55; 166/293, 285, 309

(56) References Cited

U.S. PATENT DOCUMENTS

| | | | | | |
|---|---|---|---|---|---|
| 4,259,868 | A | | 4/1981 | Rao et al. | 73/597 |
| 4,430,889 | A | | 2/1984 | Sutton et al. | 73/61.4 |
| 4,567,765 | A | | 2/1986 | Rao et al. | 73/594 |
| 4,648,264 | A | | 3/1987 | Freese et al. | 73/64.1 |
| 4,823,594 | A | * | 4/1989 | Gray | 73/54.01 |
| 5,315,864 | A | * | 5/1994 | Surjaatmadja | 73/54.32 |
| 5,869,750 | A | | 2/1999 | Onan et al. | 73/64.41 |
| 6,009,419 | A | * | 12/1999 | Coveney | 706/16 |
| 6,269,684 | B1 | * | 8/2001 | Maki, Jr. et al. | 73/53.01 |

OTHER PUBLICATIONS

Fann® Part No. 38773—a vessel known in the art utilized for receiving foamed fluids under pressure (date unknown but admitted to be prior art).

* cited by examiner

*Primary Examiner*—Hezron Williams
*Assistant Examiner*—Jay L Politzer
(74) *Attorney, Agent, or Firm*—Craig W. Roddy; Anthony L. Rahhal

(57) ABSTRACT

A method and apparatus for foaming and then testing the foamed fluid. The apparatus comprises a cylindrical pressure vessel with upper and lower caps. A circular disk with a plurality of openings, which are preferably circular openings, is placed in the pressure vessel. The apparatus also includes a motor with a shaft extending therefrom. The shaft is attached to the pressure vessel so that when the motor is actuated, the pressure vessel can be rotated in a desired revolutions per minute. The method includes placing a mixture in the pressure vessel and then attaching the caps to the upper and lower ends of the vessel. The upper cap has a pressure gauge and has a pressure inlet and a pressure relief valve. The circular disk is placed in the vessel. The vessel is pressurized to a desired pressure with a gas motor. The motor is then actuated to rotate the vessel. As the vessel rotates, the circular disk is caused to move through the mixture, which will contain at least water, cement and a foaming agent, to disperse the gas through the fluid. The rotation of the vessel will filly foam the fluid. Tests can then be conducted on the filly foamed fluid. A fluid loss test can be conducted by opening the pressure relief valve to relieve pressure in the vessel and by opening a valve in the bottom cap to allow filtrates to pass out of the vessel. Compression tests can be conducted by curing the mixed sample inside the vessel at a desired temperature for a desired time and thereafter removing the cured sample from the pressure vessel to conduct compressive strength tests.

28 Claims, 3 Drawing Sheets

APPARATUS AND METHOD FOR FOAMING FLUIDS AND FOR TESTING FOAMED FLUIDS

BACKGROUND OF THE INVENTION

This invention is directed to a method and apparatus for foaming fluids and is more particularly directed to a method and apparatus for foaming fluids inside a pressurized chamber.

Hydraulic cement slurries are commonly utilized in subterranean well operations. For example, hydraulic cement slurries are used in primary cementing operations whereby strings of pipe, such as casings are cemented in wellbores. In performing primary cementing, a hydraulic cement slurry is pumped into the annular space between the walls of the wellbore and the exterior surfaces of pipe strings disposed therein. The cement slurry is permitted to sit in the annular space to form an annular sheath of hardened substantially impermeable cement therein. The cement sheath physically supports and positions the pipe in the wellbore and bonds the exterior surfaces of the pipe to the walls of the wellbore whereby the undesirable migration of fluids between zones or formations penetrated by the wellbore is prevented. Hydraulic cement slurries are also used in a number of other operations, including remedial cementing operations.

In carrying out primary cementing, as well as remedial cementing operations in wellbores, the cement slurries utilized must often be light weight to prevent excessive hydrostatic pressure from being exerted on subterranean formations penetrated by the wellbore. As a result, a variety of light weight cement slurries have been developed and used, including foamed cement slurries.

In addition to being light weight, a foamed cement slurry contains compressed gas which improves the ability of the slurry to maintain pressure and to prevent the flow of formation fluids into and through the slurry during its transition time, i.e., the time during which the cement slurry changes from a true fluid to a hard set mass. Foamed cement slurries often include various surfactants known as foaming agents to facilitate the foaming of the cement slurry when gas is mixed therewith. Other surfactants known as foam stabilizers for preventing the foam slurries from prematurely separating into slurry and gas components may also be added to the slurry. Foamed cement slurries are also advantageous because they have low fluid loss properties.

Because wellbores have different environmental conditions, laboratory tests are conducted on foamed cement slurries to determine certain characteristics of the slurries, such as compressive strength and fluid loss characteristics, to determine the fitness of the slurry for use in a particular well environment. The present manner of foaming and then testing a foamed fluid calls for placing the mixture, including the cement and any additives, such as foaming agents, in a stirring cell. The stirring cell is then sealed and pressurized with a gas, such as, but not limited to nitrogen. Paddles in the stirring cell are then activated and the mixture is agitated and stirred with the paddles until it is sufficiently foamed. The foamed fluid is transferred through high pressure lines to a separate pressure cell so that laboratory tests, such as, but not limited to, a fluid loss test, can be conducted. The foamed fluid may also be transferred to the pressure cell and cured at a high temperature while maintaining pressure, so that a compressive strength test may be conducted on the cured sample. Because it is necessary that pressure on the foamed fluid be maintained, there are several disadvantages to this method. First, the transfer process can cause the density of the foamed fluid to vary from sample to sample. In addition, the transfer process can be unsafe if inexperienced personnel are conducting the tests. Thus, there is a need for an improved apparatus and method for foaming and then testing foamed fluids containing cement, water, and other additives such as foaming agents, surfactants and/or stabilizers.

SUMMARY OF THE INVENTION

The present invention provides an improved method and apparatus for foaming and testing fluid slurries, more specifically foamed cement slurries, for use in well operations. The method comprises placing a mixture of at least water, cement and a foaming agent in a pressure cell, which may be referred to as a pressure vessel. The term water used herein includes both water and saltwater and other additives may be included in the mixture. The pressure vessel preferably is a cylindrical pressure vessel. The method further comprises injecting a gas into the pressure vessel and foaming the mixture to form a foamed cement slurry. The method further comprises conducting laboratory tests on the foamed slurry without transferring the slurry to a separate pressure vessel. The foaming step includes placing a perforated plate in the pressure vessel and moving the perforated plate, or disk, in the pressurized vessel through the mixture to activate the foaming agent and disperse gas bubbles therein, thereby foaming the mixture. Preferably, the vessel is rotated so that the perforated plate will move through the mixture between first and second ends of the vessel.

The laboratory test to be conducted may be a fluid loss test, a compressive strength test or other desired test. It is well known in the art that if the test to be conducted is a fluid loss test, the cylindrical pressure vessel will include a screen therein. Once the fluid is sufficiently foamed, a valve on the pressure vessel may be opened so that as the slurry contacts the screen, filtrates may pass therethrough and through the opened valve to allow fluid loss characteristics of the slurry to be measured. If the compressive strength test is to be conducted, the foamed fluid can simply be cured in the pressure vessel at a desired pressure and a desired elevated temperature for a period of time. The cured specimen can then be removed from the vessel and compressive strength tests may be conducted. If desired, a sleeve may be placed in the vessel to facilitate removal of the cured specimen. The fluid loss and compressive strength tests are to be conducted in accordance with API Recommended Practice 10B For Testing Well Cements ("Recommended Practice 10B").

The apparatus includes a pressure vessel of a type known in the art which is presently utilized for receiving a pressurized foamed fluid from a separate prior art vessel used to foam the fluid. Typical pressure vessels include cylindrical vessels valved to provide for the introduction of a high pressure gas, such as air or nitrogen, and also valved so that pressure can be relieved therefrom and fluid loss tests can be conducted or a foamed sample may be cured. The vessel will typically have a pressure gauge attached thereto so that the pressure inside the vessel can be monitored. The apparatus of the present invention includes a disk or plate with a plurality of openings therethrough. The disk is disposed inside the pressure vessel.

A motor having a shaft extending therefrom is attached to the pressure vessel. The motor can be of any type known in the art, and when activated will rotate the vessel at a desired revolutions per minute (rpm) of approximately 1 to 15 rpm, preferably at about 1.5 to 3 rpm, and more preferably at about 3 rpm. The disk in the pressure vessel will move through the fluid as the vessel is rotated. As the disk moves through the mixture, the gas in the vessel will react with the foaming agent to foam the mixture. Once the fluid is sufficiently foamed, laboratory tests, such as fluid loss and compressive strength tests can be conducted in accordance with Recommended Practice 10B.

It is therefore a general object of the present invention to provide an improved method and apparatus for foaming slurries and for testing the slurries. Other and further objects, features and advantages of the present invention will be readily apparent to those skilled in the art in view of the drawings herein, and a reading of the description of the preferred embodiments which follows.

DETAILED DESCRIPTION OF THE PREFERRED EMBODIMENTS

Figure 1:
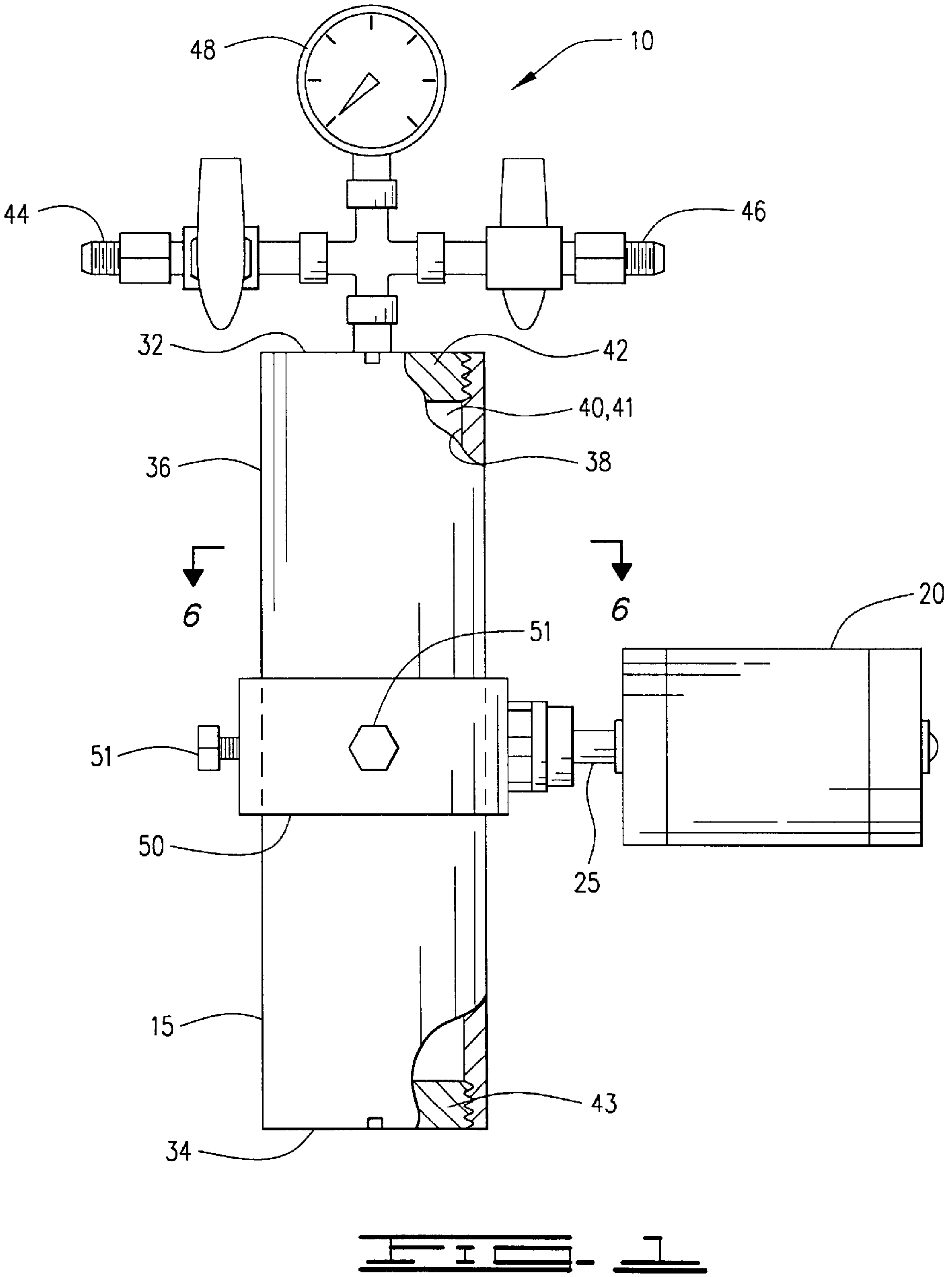
FIG. 1 is a schematic of the apparatus of the present invention.
Figure 3:
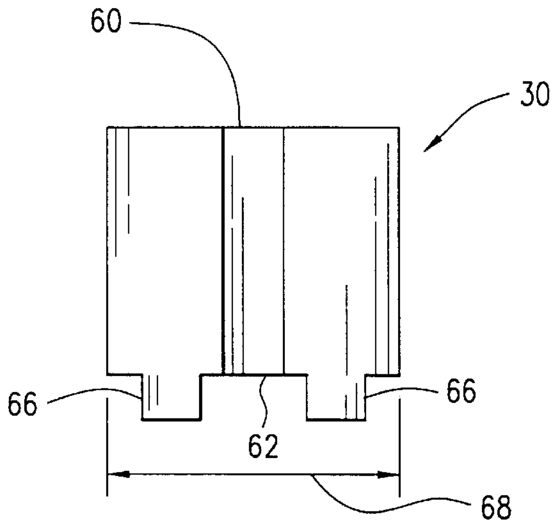
FIG. 3 is a side view of the circular disk of the present invention.
Figure 4:
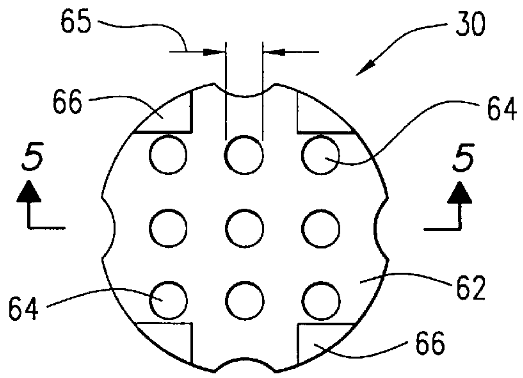
FIG. 4 is a bottom view of the circular disk of the present invention.
Figure 5:
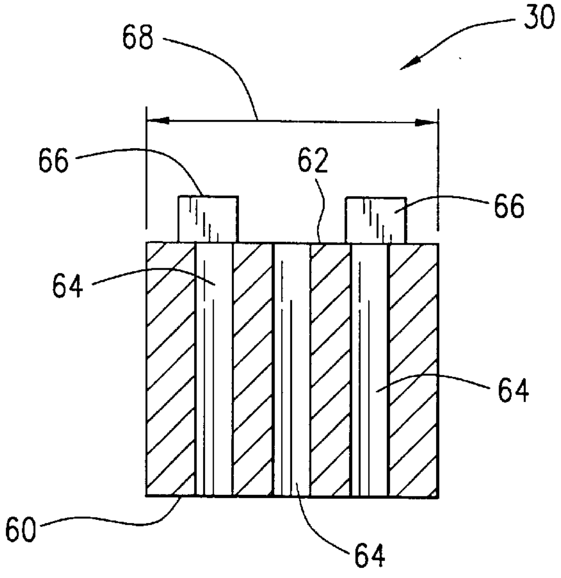
FIG. 5 is a section view from line 4—4 of FIG. 5.

Referring now to the drawings, more particularly FIG. 1, the foaming apparatus 10 of the present invention may be shown and described. Foaming apparatus 10 may also be referred to as a testing apparatus. Foaming apparatus 10 comprises a pressure cell, or vessel 15, a motor 20 which is preferably a variable speed motor of a type known in the art, and a shaft 25 extending from motor 20 and connected to pressure vessel 15. The shaft may be mechanically connected to pressure vessel 15 by any means known in the art. The apparatus further includes a circular disk 30. Circular disk 30 is shown in detail in FIGS. 3–5 and as will be described in more detail herein, is disposed in pressure vessel 15, to foam the fluid contained therein.

Pressure vessel 15 is shown schematically and is of a type known in the art utilized for receiving foamed fluids under pressure. One known vessel is a FANNY® Part No. 38773. Thus, pressure vessel 15 is preferably a generally cylindrical vessel having upper end 32, lower end 34, outer surface 36 and an inner surface 38 which defines a cylindrical opening 40 with diameter 41. Cylindrical opening 41 may be referred to as a cylindrical foaming chamber. Pressure vessel 15 may have removable upper cap 42, and removable lower cap 43. Caps 42 and 43 have threads thereon and are threadedly received in upper and lower ends 34 and 36, respectively. Pressure vessel 15 also has inlet valve 44 and a pressure relief valve 46 attached to cap 42. A valve, such as a needle valve, may be disposed in lower cap 43 to allow fluid loss tests to be conducted. A pressure gauge 48 may be connected to cap 42 so that pressure in vessel 15 may be monitored. Shaft 25 may be attached to pressure vessel 15 by any means known in the art and is shown attached with a circular bracket 50 which extends around pressure vessel 15 and is attached to shaft 25. Bolts 51 extend through bracket 50 and secure vessel 15 thereto.

Figure 2:
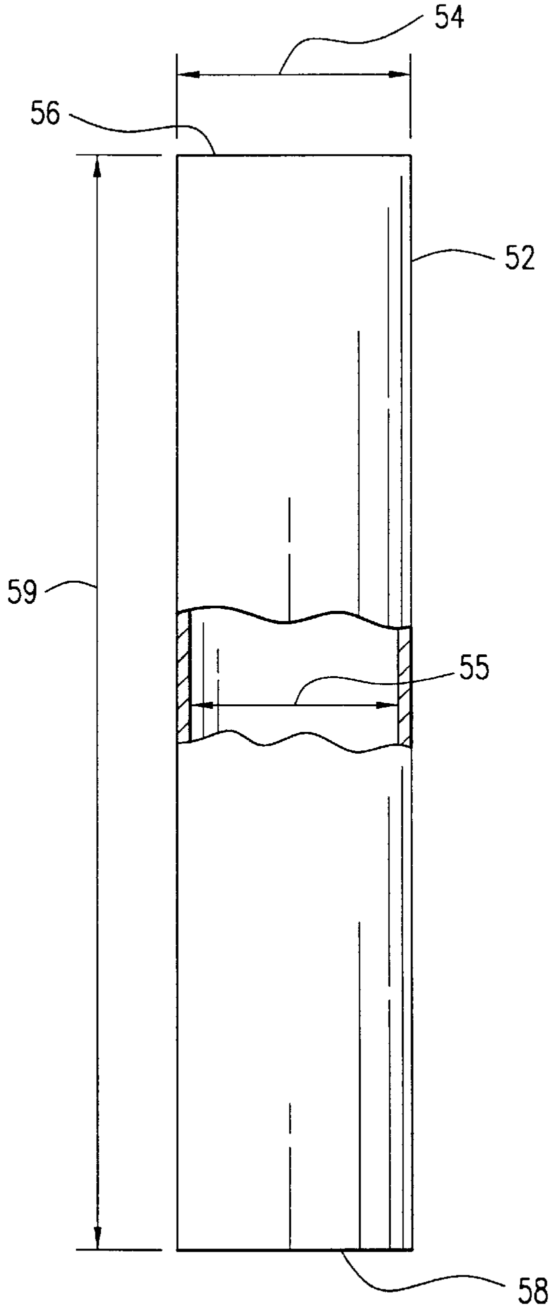
FIG. 2 is a sleeve used in connection with the method and apparatus of the new invention.

FIG. 2 shows a cylindrical sleeve 52 having an outer diameter 54, inner diameter 55, upper end 56, lower end 58 and length 59. Cylindrical sleeve 52 may be used with apparatus 10 to aid in conducting compressive strength tests, as will be explained hereinbelow.

Mixing apparatus 10 further includes circular disk 30 having upper end 60 and a lower end 62. Circular disk 30 defines a plurality of openings 64 extending therethrough from upper end 60 to lower end 62. Openings 64 may comprise circular holes having a diameter 65. Disk 30 may also have legs 66, in this case four legs extending from the lower end 62 thereof.

Figure 6:
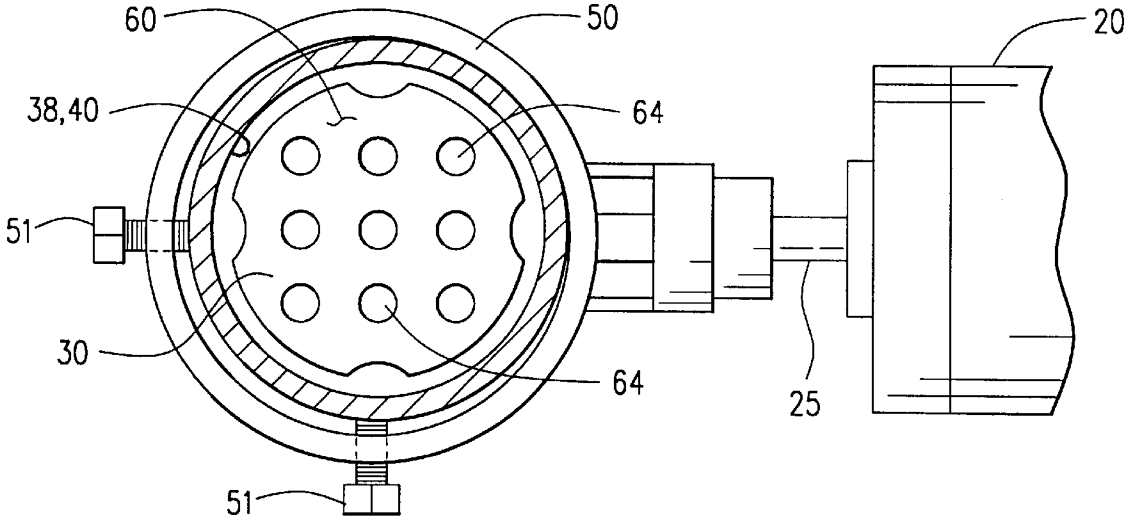
FIG. 6 is a view taken from line 6—6 of FIG. 2.

As shown in FIG. 6, circular disk 30 has an outer diameter 68, which is smaller than inner diameter 40 of pressure vessel 15, and which is smaller than inner diameter 55 of sleeve 52. Thus, the circular disk 30 may be received in pressure vessel 15 particularly in cylindrical opening 40 having diameter 41, and is moveable therein between the ends of the pressure vessel.

The method of the present invention may be described as follows. Desired amounts of cement, water and other desired additives, including a foaming agent, are mixed. The disk 30 is placed inside the vessel with the legs pointing toward lower end 34. The mixture is poured into the vessel, to which cap 43 is already connected, and upper cap 42 is placed thereon. The chamber is then pressurized to any desired pressure, preferably 500 to 1,500 psi, more preferably approximately 1,000 psi. The chamber can be pressurized with any desired gas, preferably air or nitrogen, and more preferably nitrogen.

Diameter 65 of openings 64 may be of any size that will allow disk 30 to pass through the mixture in the vessel, and is preferably in the range from 0.125 to 0.50 inches, and more preferably 0.25 inches. Once the pressure vessel has been pressurized to the desired pressure, the motor is actuated to turn the shaft and to slowly rotate pressure vessel 15 at a desired rate, which may be between 1 and 15 rpm, but is more preferably from about 1.5 to 3 rpm, and more preferably about 3 rpm. Diameter 65 is such that as disk 30 moves through the fluid due to the rotation of the pressure vessel, the pressurized gas will react with the foaming agent and will be dispersed into the fluid. Full foaming of the fluid will occur usually between three and twenty minutes of vessel rotation, but the time may vary.

Generally, the mixture will be fully foamed within 15 minutes of rotation. During rotation, while large pockets of gas exist in the vessel, the velocity at which the disk 30 moves will increase rapidly as it passes through such gas pockets and will decrease rapidly as it re-engages the fluid, or the end of the chamber. Such rapid increases and decreases cause sounds that are audible to the operator. When the disk passes through the mixture at a fairly constant rate, the sounds associated with rapid increases and decreases are eliminated, indicating a fully foamed mixture. In any event, rotation for 15 minutes will fully foam in almost all cases.

Once the fluid is foamed, laboratory tests can be conducted without transferring the foamed fluid to a separate testing vessel since the fluid has been foamed in pressure vessel 15 to which, under current recognized practice, the foamed fluid would be transferred. If a fluid loss test is to be conducted, a screen, as is the known in the art, will be disposed in pressure vessel 15. Rotation will be stopped, and pressure will be released with valve 46. The valve (not shown) in bottom cap 43 will be opened so that filtrate can pass therethrough, and fluid loss characteristics can be determined. Legs 66 will prevent disk 30 from covering the screen in the pressure vessel and the foamed fluid will pass through holes 64 to the screen. It is known in the art that fluid loss characteristics are determined by measuring the amount of filtrate that passes through the screen and valve. Thus, the fluid loss test is conducted in a well known manner in accordance with Recommended Practice 10B. The novelty in the invention is that the fluid is foamed in vessel 15 in which the test is to be conducted, as opposed to being foamed in a separate vessel and then transferred to pressure vessel 15.

If a compressive strength test is to be conducted, no screen will be placed in the pressure vessel. If desired, a cylindrical sleeve, such as sleeve 52, may be placed in pressure vessel 15. Once the fluid is foamed, temperature can be increased to a desired temperature so that the vessel, and the foamed fluid in the vessel can be cured at a desired temperature and pressure for a specified time. Once the foamed fluid is cured, cap 42 or 43 can be removed and the cured sample can be removed from pressure vessel 15 and a compressive strength test can be conducted in the manner known in the art in accordance with Recommended Practice 10B.

Again, the tests conducted herein are known in the art and vessel 15 itself is known in the art. Use of circular disk 30 to foam the fluid in vessel 15 is new and the method of foaming and testing is novel since in the prior art the only manner in which such tests could be conducted was to foam the fluid in a separate vessel and to transfer the foamed fluid under high pressure to a pressure vessel, such as vessel 15.

Thus, the present invention is well adapted to carry out the objects and attain the ends and advantages mentioned herein as well as those which are inherent. While numerous changes may be made by those skilled in the art, such changes are encompassed within the spirit of this invention as defined by the appended claims.

What is claimed is:

1. An apparatus for foaming a well cement slurry comprised of a mixture of at least water, cement and a foaming agent, the apparatus comprising:

a pressure vessel defining a generally cylindrical chamber therein;

means for injecting a gas into said pressure vessel;

a perforated disk disposed in said cylindrical chamber; and means for moving said perforated disk through said mixture to activate said foaming agent and foam said slurry.

2. The apparatus of claim 1 wherein said pressure vessel comprises a fluid loss vessel with a mesh screen disposed therein so that fluid loss tests may be conducted on said slurry after said slurry has been foamed.

3. The apparatus of claim 1 wherein said means for moving comprises a means for rotating said pressure vessel, so that said disk moves through said fluid between first and second ends of said pressure vessel.

4. The apparatus of claim 3 wherein said means for moving comprises:

a motor; and a shaft extending from said motor and connected to said pressure vessel, wherein said motor rotates said shaft and said vessel so that said disk moves through said slurry in said vessel to activate said foaming agent and foam said slurry.

5. The apparatus of claim 1, further comprising a removable cylindrical sleeve disposed in said vessel, wherein said slurry may be foamed and cured in said pressure vessel at a desired elevated temperature, and wherein said sleeve and said cured mixture may be removed from said vessel so that tests may be conducted on said cured slurry.

6. The apparatus of claim 1, said pressure vessel having an inner diameter, said perforated disk comprising a generally circular disk defining a plurality of holes therethrough.

7. An apparatus for foaming a well cement sample including at least water, cement and a foaming agent, comprising:

a cylindrical foaming chamber;

a perforated disk slidably disposed in said cylindrical foaming chamber; and means for rotating said cylinder to cause said disk to move in said cylindrical foaming chamber to agitate and foam the well cement sample in said cylindrical foaming chamber.

8. The apparatus of claim 7 further comprising:

an inlet for connecting to a gas source, so that said cylindrical foaming chamber may be pressurized to a desired pressure.

9. The apparatus of claim 7, further comprising:

a mesh screen disposed in said cylindrical foaming chamber, said cylindrical foaming chamber being adapted to be pressurized to a desired test pressure for conducting a fluid loss test; and an outlet valve for allowing filtrates that pass through said screen to exit said cylindrical foaming chamber so that said fluid loss test can be conducted on said sample without transferring said sample to a separate test chamber.

10. The apparatus of claim 7, further comprising:

a motor; and a shaft extending from said motor and connected to said cylindrical foaming chamber for rotating said cylindrical foaming chamber.

11. The apparatus of claim 7, further comprising:

a pressure gauge for monitoring an internal pressure of said cylindrical foaming chamber;

an inlet valve communicated with said cylindrical foaming chamber for connecting to a pressure source; and an outlet valve communicated with said chamber for releasing said internal pressure.

12. The apparatus of claim 7, said cylindrical foaming chamber comprising a pressure vessel having a removable end cap; wherein said pressure vessel may be pressurized to a desired pressure and heated to a desired temperature to cure said foamed sample, and wherein said end cap may be removed and said cured sample removed from said pressure vessel so that compressive strength tests may be conducted thereon.

13. A method of testing a well cement comprising:

placing desired amounts of at least water, cement, and a foaming agent in a pressure vessel to form a mixture;

injecting a gas into said pressure vessel to pressurize said vessel to a desired pressure above atmospheric pressure;

foaming said mixture in said pressure vessel; and conducting a fluid loss test on the foamed mixture without transferring said mixture to a separate pressure vessel.

14. The method of claim 13, said foaming step comprising rotating said vessel.

15. The method of claim 14, wherein said vessel has a plate slidably disposed therein, said plate having a plurality of openings therethrough, and wherein said rotating step causes said plate to move through said fluid to activate said foaming agent and disperse bubbles of said gas in said mixture.

16. The method of claim 13, wherein said injecting step comprises pressurizing said chamber to at least about 500 psi.

17. The method of claim 13, further comprising:

curing said foamed mixture in said vessel at an elevated temperature for a desired amount of time after said fluid loss test;

removing said cured mixture from said vessel;

conducting a compressive strength test on said cured mixture.

18. The method of claim 13, further comprising conducting said test prior to releasing the pressure in said pressure vessel.

19. The method of claim 18, further comprising releasing the gas from said pressure vessel to relieve the pressure therein.

20. A method of testing a well cement comprising:

placing desired amounts of at least water, cement, and a foaming agent in a pressure vessel to form a mixture;

injecting a gas into said pressure vessel to pressurize said vessel to a desired pressure above atmospheric pressure;

rotating said mixture in said pressure vessel to foam said mixture; and conducting a test on the foamed mixture without transferring said mixture to a separate pressure vessel.

21. The method of claim 20, further comprising:

curing said foamed mixture in said vessel at an elevated temperature for a desired amount of time prior to said conducting step; and removing said cured mixture from said vessel;

wherein said conducting step comprises conducting a compressive strength test on said cured mixture.

22. The method of claim 20, wherein said test comprises a fluid loss test.

23. The method of claim 20, wherein said vessel has a plate slidably disposed therein, said plate having a plurality of openings therethrough, and wherein said rotating step causes said plate to move through said fluid to activate said foaming agent and disperse bubbles of said gas in said mixture.

24. The method of claim 20, further comprising conducting said test prior to releasing the pressure in said pressure vessel.

25. A method of testing a well cement comprising:

placing desired amounts of at least water, cement, and a foaming agent in a pressure vessel to form a mixture;

injecting a gas into said pressure vessel to pressurize said vessel to a desired pressure above atmospheric pressure;

foaming said mixture in said pressure vessel, said vessel having first and second ends and having a plate disposed therein, said plate defining a plurality of openings therethrough, wherein said foaming step comprises moving said perforated plate through said mixture between said first and second ends to activate said foaming agent and disperse bubbles of said gas therein; and conducting a test on the foamed mixture without transferring said mixture to a separate pressure vessel.

26. The method of claim 25, further comprising:

curing said foamed mixture in said vessel at an elevated temperature for a desired amount of time prior to said conducting step; and removing said cured mixture from said vessel;

wherein said conducting step comprises conducting a compressive strength test on said cured mixture.

27. The method of claim 25, wherein said test comprises a fluid loss test.

28. The method of claim 25, said foaming step comprising rotating said vessel to cause said plate to move through said mixture.

* * * * *